United States Patent [19]
Coleman et al.

[11] 3,751,202
[45] Aug. 7, 1973

[54] COEXTRUSION APPARATUS

[75] Inventors: Paul E. Coleman; John T. Haub; Joseph T. Sullivan; Dennis L. Pommer, all of Minneapolis, Minn.

[73] Assignee: General Mills, Inc., Minneapolis, Minn.

[22] Filed: Apr. 15, 1971

[21] Appl. No.: 134,165

[52] U.S. Cl................................. 425/133, 264/171
[51] Int. Cl............................................. A22c 11/02
[58] Field of Search.................... 425/133, 378, 461; 264/171; 99/169, 175, 176, 441

[56] References Cited
UNITED STATES PATENTS 3,189,941 6/1965 Reifenhauser...................... 425/133
3,241,503 3/1966 Schafer........................... 425/133 X
3,622,353 11/1971 Bradshaw et al..................... 99/169
3,635,624 1/1972 Nakakoshi et al................. 425/133

FOREIGN PATENTS OR APPLICATIONS 965,442 6/1957 Germany............................ 425/133
1,015,341 9/1957 Germany............................ 425/133

Primary Examiner—R. Spencer Annear
Attorney—Anthony A. Juettner, Gene O. Enockson and Norman P. Friederichs

[57] ABSTRACT

Method and apparatus is disclosed for coextruding a heat sensitive material such as meat and a hot plastic casing material such as of protein.

9 Claims, 5 Drawing Figures

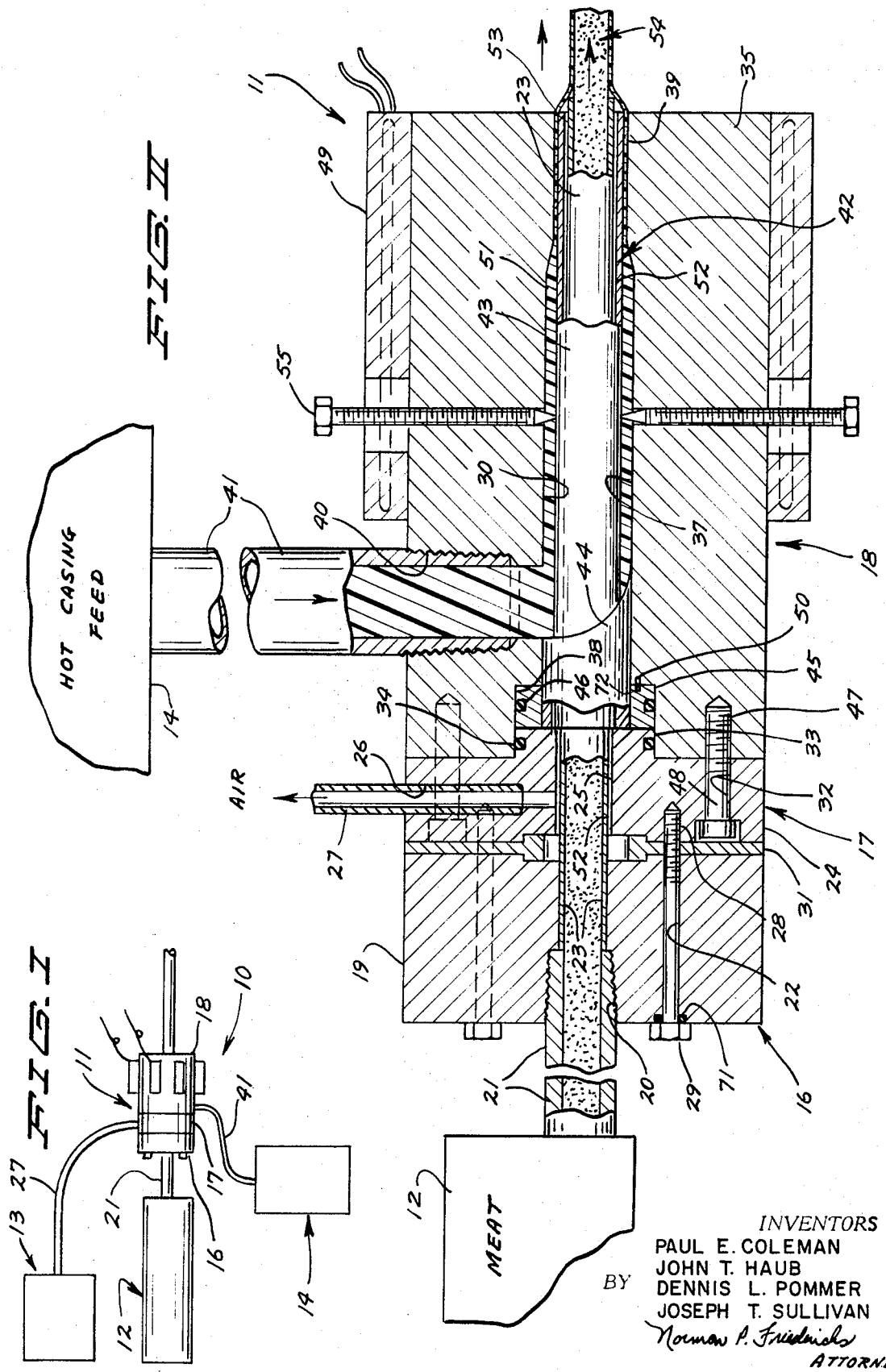

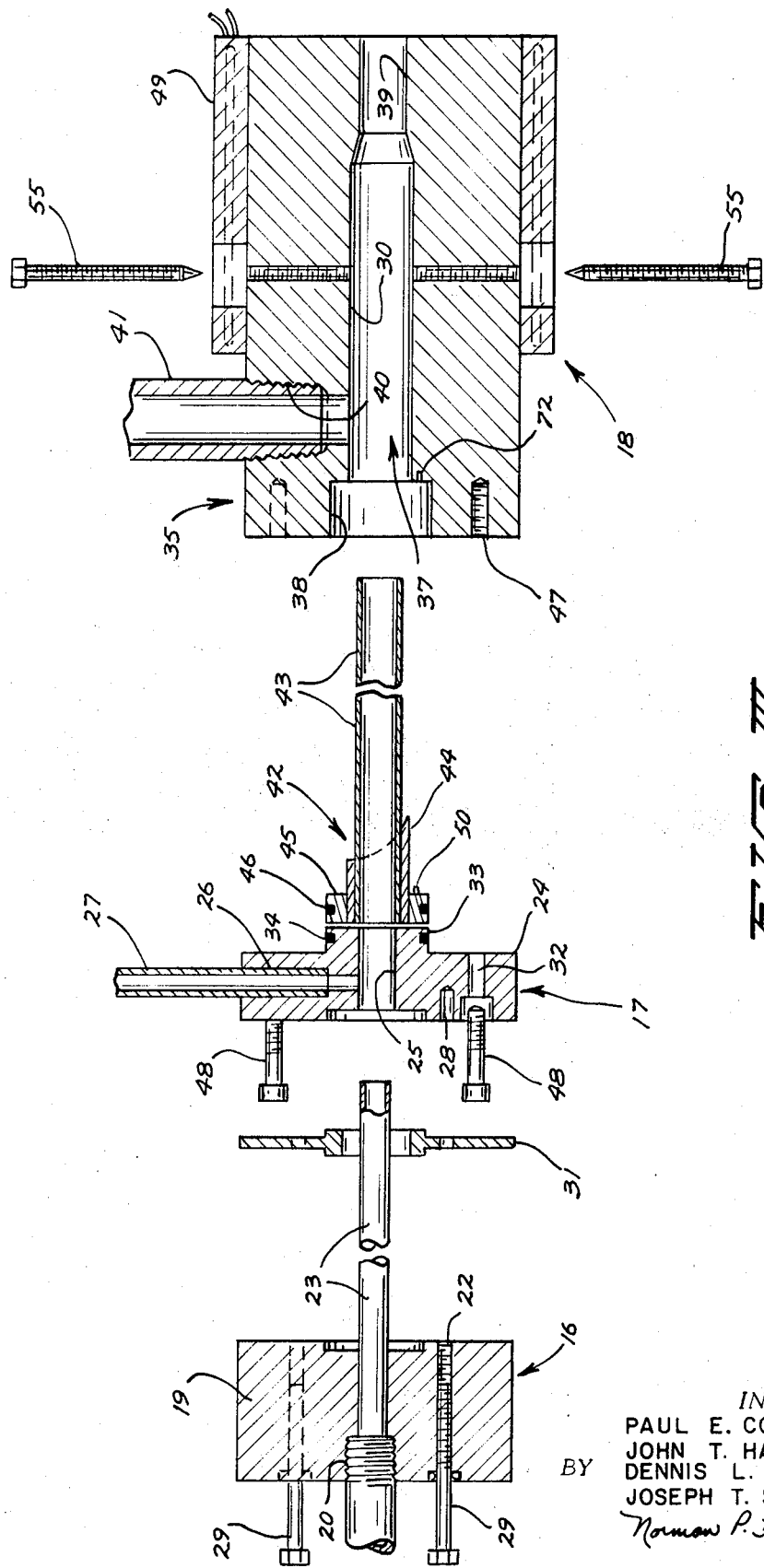

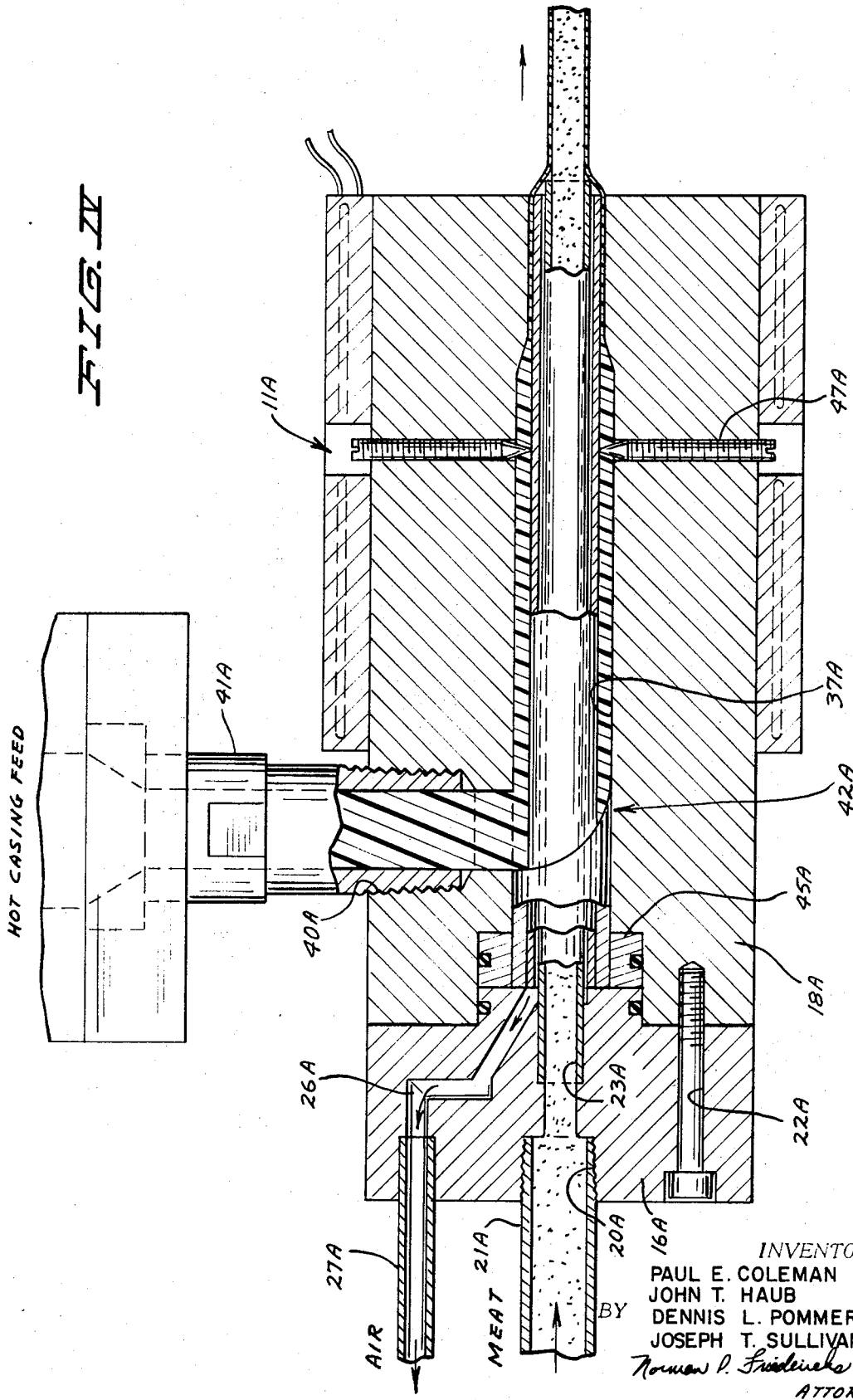

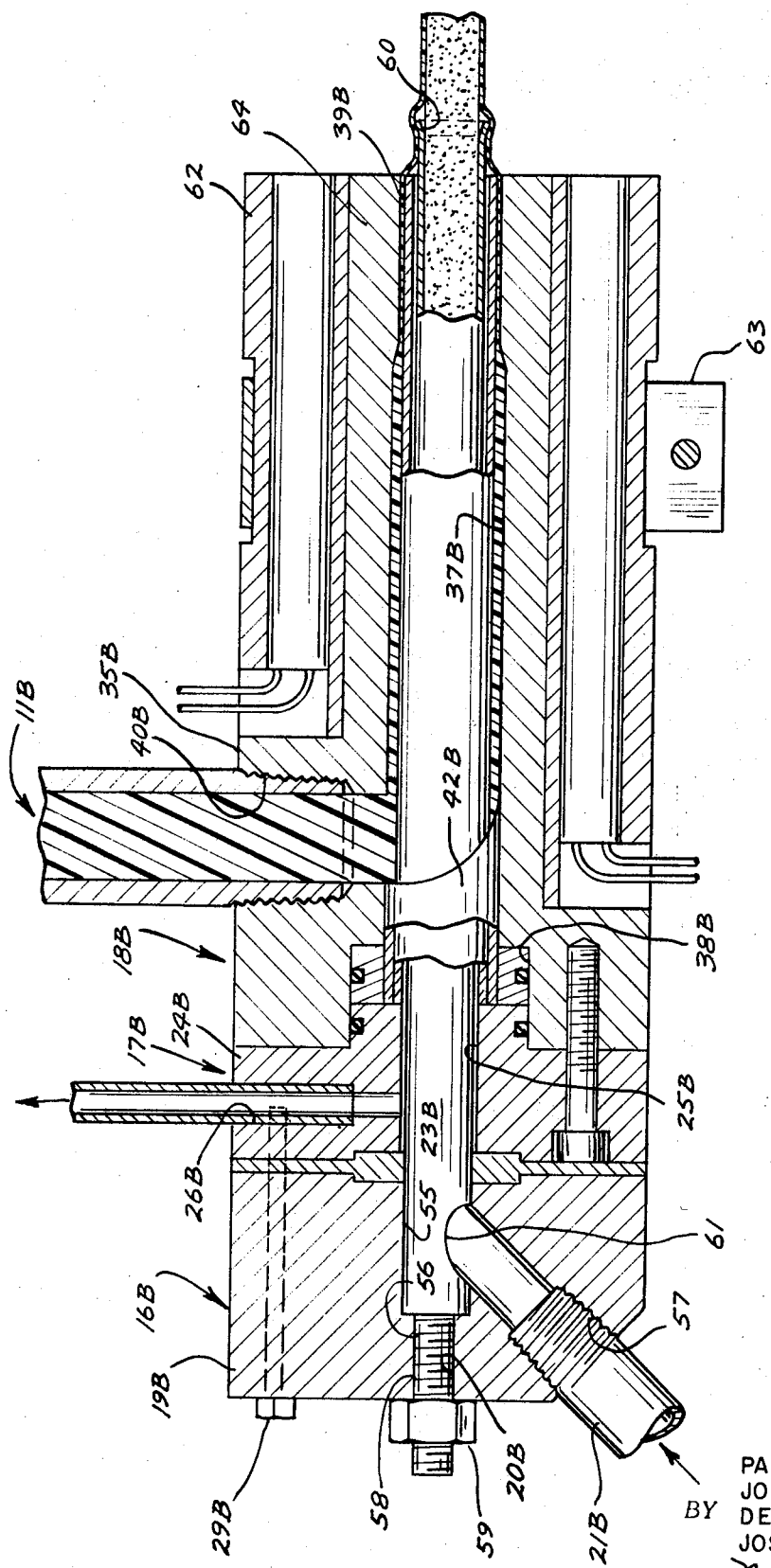
FIG. II
INVENTORS
PAUL E. COLEMAN
JOHN T. HAUB
DENNIS L. POMMER
JOSEPH T. SULLIVAN
BY Norman P. Friedericks
ATTORNEY

COEXTRUSION APPARATUS

BACKGROUND OF THE INVENTION

The present invention relates to extrusion and more particularly to coextrusion of a heat sensitive material and a hot plastic casing.

Products which are enclosed in a casing or film are well known. Such products typically include fresh and dry sausage as well as weiners. In the past such products have been prepared by extruding a casing, for example, protein or cellulose, and later stuffing a meat formulation into the casing. In some instances the meat formulation or filling is cooked prior to encasing and in other instances the casing is filled and then the product is subjected to a smoking process.

Coextrusion is known. For example, it was recently discovered that edible protein based casings and a meat material may be coextruded. Although acceptable products are obtained, the characteristics of the meat and the casing material result in certain difficulties during coextrusion. For example, the temperatures necessary for satisfactory production of a hot plastic protein mass for extrusion of a casing are high and may scorch or burn the meat formulation in the die. On the other hand the hot plastic material may be adversely affected by premature cooling due to heat loss to the cold meat. Also, the casing material or the filling material may produce gaseous products which result in bubble formation or pockets between the filling material and the casing thus producing an unsightly appearance. For example, a hot casing material of one preferred type may produce steam and/or other gaseous vapors. The method and apparatus of the present invention substantially overcome such difficulties.

The present invention in its broadest aspects relates to extrusion equipment including a die for coextruding any heat sensitive material and a hot plastic encasing material. The process of the present invention includes (1) forming an extrudable hot plastic mass and (2) simultaneously (A) extruding the hot plastic mass through an annular die to form a casing and (B) introducing filling comprising a flowable heat sensitive material into the center of the forming casing, substantially filling the interior of the casing. An insulative barrier is provided between the hot plastic casing material and the heat sensitive material while said materials are traveling through the die. In a preferred embodiment a partial vacuum is provided between the casing and the heat sensitive material at the point of extrusion, thereby reducing or eliminating any gas filled pockets between the casing and the heat sensitive material. The present invention in its narrower aspects relates to coextruding a meat emulsion and a hot plastic protein casing.

The term "heat sensitive material" as used herein means any material, edible or non-edible, that may be encased in a hot plastic material by coextrusion except for the fact that it is adversely affected by the temperature of the hot plastic material. The adverse effect may be degradation such as the charring of the meat. On the other hand, the adverse effect may be a change in physical state from a solid or semi-solid to a liquid state such as is the case with jelly and cheese. Typical heat sensitive materials include meat, cheese, puddings, jelly and various materials that become solid or semi-solid at reduced temperatures.

The hot plastic casing material may be any material that becomes plastic upon heating and working (such as in a screw extruder) and that provides a satisfactory casing around the heat sensitive material. The casing material may be typically protein, cellulose, polyethylene, polypropylene, polyvinyl chloride, polyvinylidene chloride and the like. The casing material is preferably non-heat coagulable, simple proteins such as those described in U.S. Pat. Application Ser. No. 20,799 now U.S. Pat. No. 3,674,506, the disclosure of which is herewith incorporated by reference. The present invention will be described with respect to coextrusion of a protein casing and a meat emulsion filling.

In the drawings:

FIG. I is a schematic illustration of the apparatus of the present invention.

FIG. II is a cross-sectional view of one embodiment of the extrusion die of the present invention.

FIG. III is an exploded view of the die of FIG. II.

FIG. IV is a cross-sectional view of another embodiment of the die of the present invention.

FIG. V is a cross-sectional view of a further embodiment of the die of the present invention.

The apparatus 10 of the present invention, one preferred embodiment of which is shown in FIG. I, includes a coextrusion die 11, a meat extrusion supply 12 (such as a Zuber E-Z-PAC), means for moving an insulating fluid (such as a pump) 13 and a hot plastic material extrusion supply 14 (such as a Wayne Extruder).

The coextrusion die 11 (FIGS. I–III) has a rear section 16, a midsection 17 and a forward section 18. The rear section 16 has a body member 19 with a central opening or passageway 20 defined therein which may be threaded for engagement with a meat supply line 21 from screw 12. The rear section 16 may further include a plurality of openings 22 in body member 19 for purposes hereinafter described. A meat tube 23 extends into and is integrally mounted in body member 19.

The midsection 17 includes a body member 24 with a centrally disposed opening or passageway 25 defined therein. The opening 25 is aligned with the opening 20 in section 16. The body member 24 has an opening 26 with a threaded portion for engagement with a gas line 27. The opening 26 thus provides communication between gas line 27 and central opening 25. The body member 24 has a plurality of openings such as 28 therein which are aligned with openings 22 in rear section 16. The openings 28 may be threaded for reception of screws such as 29 which secure the rear section 16 to the midsection 17. The screws 29 may be suitably heat insulated from rear section 16 such as by insulating washer 71. A suitable seal 31 may be provided between sections 16 and 17. The seal 31 serves as a heat barrier between sections 16 and 17 and prevents escape of gas therebetween. The midsection 17 further includes a plurality of openings 32 for purposes hereinafter described. The midsection 17 may include a forwardly extending portion 33 of reduced cross-sectional area. The reduced portion 33 may have a recess in which a ring seal 34 is seated.

The forward section 18 includes a body member 35 with a centrally disposed opening or passageway 37 which is aligned with the openings 20 and 25 in body members 19 and 24 respectively. Opening 37 serves as a passageway for the extrusion materials. The opening 37 has a portion 38 of enlarged diameter adjacent midsection 17, a portion 39 of reduced diameter at the forward end of section 18 and a middle portion 30 of intermediate diameter. The body member 35 has a threaded opening 40 for engagement with line 41 which carries the hot plastic casing material.

A mandrel 42 is disposed in the opening 37 in section 18. The mandrel 42 has a tubular portion 43, a shoulder portion 44 and a support flange 45. The tubular portion 43 has an external diameter which is slightly smaller than the opening 37 at the forward end of section 18 providing sufficient space therebetween for extrusion of a film of the desired thickness. The shoulder portion 44 has an external diameter substantially the same size as the diameter of the middle portion 30 of opening 37. The support flange 45 has an external diameter substantially the same size as the enlarged portion 38 of opening 37. The support flange 45 may have a recess for reception of a ring seal 46 which provides sealing engagement between the support flange 45 and forward section 18. The shoulder portion 44 and the flange 45 may be formed from a single piece by machining. The mandrel 42 has a pin 50 to maintain alignment of the forward edge of shoulder 44 with the desired flow of plastic material. The pin 50 is aligned with and extends into opening 72 in forward section 18.

Body member 35 has a plurality of openings 47. Screws such as 48 extend through openings 32 in body member 24 and are threadedly engaged in opening 47 thereby securing section 17 to section 18. A plurality of screws 55 are threadedly engaged in body member 35 for purposes hereinafter described. The forward section 18 has a plurality of heating elements 49 for maintaining the casing material in a plastic state. The heating elements 49 may be mounted on the exterior of section 18 as shown in FIG. II or they may be mounted in suitable openings which may be provided in body member 35 of section 18.

The die 11 may be assembled (FIGS. II and III) by inserting the mandrel 42 into section 18 so that tubular portion 43 extends through opening 37 and flange 45 lies within enlarged portion 38 of opening 37. The tubular portion 43 is slightly smaller in diameter than opening 37 thereby defining a casing material passageway therebetween. The midsection 17 may be mounted on forward section 18 with portion 33 extending into opening 37 in abutting engagement with flange 45. A plurality of screws such as 48 extend through opening 32 in section 17 and are threadedly engaged in opening 47 in section 18 thereby securing said sections together. The rear section 16 may be mounted by extending meat tube 23 through opening 25 in section 17 and through the hollow mandrel 42. The external diameter of tube 23 is slightly smaller than the internal diameter of portion 43 of mandrel 42 thereby defining a gas passageway 52 therebetween. The tube 23 and portion 43 of mandrel 42 thus combine to form a heat insulating barrier between the cold meat and the hot plastic casing material. The external diameter of tube 23 is also slightly smaller than the diameter of opening 25 thereby defining a gas passageway 53. The tube 23 preferably extends slightly beyond the forward edge of body member 35 thus protecting the meat from the heat of body member 35. A plurality of screws, such as screw 29 extend through an opening 22 in section 16 and are threadedly engaged in opening 28 in section 17 thereby securing said sections together. The assembled die 11 may be connected to meat feed line 21, gas line 27 and casing material feed line 41.

OPERATION OF THE INVENTION

The apparatus 10 may be placed in operation by adding suitable casing material to the screw 14 where it is mixed and worked until it becomes a plastic mass. The term "plastic" means that the casing material is capable of being deformed continuously and permanently in any direction without rupture and may be extruded to form a uniform film.

The extrudable plastic mass in the instance of use of protein may include a simple protein and a liquid, principally water. The weight ratio of protein to liquid may be about 1:4 to 6:1 depending somewhat upon the particular proteinaceous substance employed. Various suitable protein source materials are commercially available or can be prepared by known procedures. Wheat gluten, for example, is obtained by separating it from wheat by any convenient means and the same is commercially available. Spray dried and flash dried wheat gluten are commerically available forms suitable for use in the invention. One preferred commercially available wheat gluten product is Pro80, available from General Mills, Inc. This product is a flash dried vital wheat gluten which may contain several percent moisture and on a moisture-free basis is comprised of about 80 percent vital wheat gluten, 5–10 percent fat and 10–15 percent starch. It is preferred that the gluten source contains at least about 80 percent vital wheat gluten, with the remainder being diluent materials such as residual fat or lipid, starch, flour and the like. The screw 14, which may be a Brabender type 200 extruder or a Wayne extruder, forces the mass of plastic casing material through the pipe 41 into the forward section 18 of die 11. The hot plastic mass enters the passageway 51 and flows around the tubular portion 43 of mandrel 42. The forward edge of the shoulder 44 may be sloped so as to assist in spreading the hot plastic mass around the tubular portion 43. The forward section 18 is preheated by heaters 49 to a temperature at which the casing material will be sufficiently plastic to provide uniform flow. The temperature of section 18 in the case of protein casing material will typically be in the range of about 275° to 350°F. depending on extrusion speed.

Compressed gas may be forced into the passageway 52 which is between the meat tube 48 and the mandrel 42. The gas inflates the extruded casing 53. The mandrel 42 may now be centered by adjustment of the screws 55 to provide a casing having walls of uniform thickness. Meat such as weiner or sausage emulsion may be added to the extruder 12, forced through the meat pipe 21 into the rear section 16 of the coextrusion die 11. The meat is then forced into the meat tube 23 and out of the forward end of the die 11. Once the meat begins extruding from the forward end of die 11, a partial vacuum may be provided in the passageway 52. The vacuum should be sufficient to remove gaseous products from between the extruding meat and casing and promote good adhesion therebetween. The vacuum should be less than the amount which will draw the meat and/or casing material into the passageway 52. For example, the vacuum may be on the order of 1–5 millimeters of mercury. The pump or aspirator 13 thereby withdraws any gaseous products that are produced between the casing 53 and the meat emulsion 54 such as steam or vapor. The passage of such gases through passageway 52 maintains an insulating barrier between the mandrel 42 and the meat tube 23 thereby preventing excessive heating or scorching of the meat, as well as, preventing premature cooling of the hot plastic mass in passageway 51. During operation, if it is necessary to clean the meat tube 23, the rear section 16 may be removed without disassembling or shutting down the plastic mass extrusion.

ALTERNATE EMBODIMENTS

An alternate embodiment die 11A is shown in FIG. IV. Die 11A is constructed similar to die 11 except that die 11A does not have a midsection. Die 11A has a forward section 18A including a central passageway 37A. Section 18A has an opening 40A which provides communication between the casing material feed pipe 41A and central passageway 37A. Section 18A may be constructed identically to section 18 of die 11. The mandrel 42A which may be identical to mandrel 42 is disposed in passageway 37A.

Die 11A has a rear section 16A with an opening 20A through which the meat emulsion enters the die 11A from feed line 21A. The rear section 16A further includes an opening 26A for reception of line 27A through which gaseous materials may enter or leave die 11A. The meat tube 23A may be heat fitted or threaded at its rear portion into section 16A. The meat tube 23A extends forwardly through the mandrel 42A. Die 11A is more simple in construction than die 11; however, the meat tube cannot be removed for cleaning without stopping production of casing. The operation of die 11A is substantially identical to that of die 11 and therefore will not be further described.

Die 11B, an alternative embodiment of the present invention illustrated in FIG. V, has a rear section 16B, a midsection 17B and a forward section 18B. The rear section 16B has a body member 19B with a central opening 20B. The opening 20B has a forward portion 55 and a rear portion 56 of reduced diameter. An opening 57 extends rearwardly and radially outwardly from portion 55 of opening 20B. The opening 57 serves to connect die 11B with the meat supply line 21B. The meat tube 23B is hollow except for an integral, solid, threaded rod portion 58 which extends through rear portion 56 of opening 20B. A nut 59 secures tube 23B to section 16B. Meat tube 23B has a rear opening 61 through which meat enters from opening 57. The meat tube 23B is radially flared at the forward end 60.

The midsection 17B includes a body member 24B with a central passageway 25B and a radially extending opening 26B through which a gas may enter and/or leave die 11B. The rear section 16B and midsection 17B are secured together by screws 29B.

The forward section 18B has a body member 35B with a central opening 37B which is aligned with openings 20B and 25B in body members 19B and 24B, respectively. The opening 37B has an enlarged rear portion 38B and a reduced forward portion 39B. A mandrel 42B is disposed in opening 37B. The body member 35B has a passageway 40B which connects a source of the hot plastic material with the central opening 37B. The body member 35B has forward portion 64 of reduced cross section. A heat jacket 62 surrounds portion 64 and is secured in place by clamp 63.

The operation of die 11B is substantially identical to die 11 and therefore will not be further described except for the mounting and dismounting of the meat tube 23B. Since the meat tube 23B has a flared forward portion 60 which is larger than portion 39B of opening 37B, the meat tube 23B is mounted by insertion from the forward end of die 11B, through opening 37B, then 25B and finally 20B. The nut 59 is then threadedly engaged with rod portion 58 of meat tube 23B. Removal of tube 23B is carried out by removing nut 59 and pulling tube 23B forwardly out of the die 11B. Thus meat tube 23B may be removed without disassembling of sections 16B, 17B and 18B. Moreover, meat tube 23B may be removed without discontinuing extrusion of the casing material.

EXAMPLE

Sausage casing material was prepared by mixing in a Hobart mixer for 10 to 15 minutes 2000 grams of gluten, 1200 grams water, 160 milliliters of 15 normal ammonium hydroxide, 20 grams sodium sulfite, 100 grams Cab-o-Sil EH 5 * (*A fumed silica having the following characteristics: Surface area $m^2gm$ (BET) 390±40 ; Particle size-micron 0.007; 325 Mesh residue-max. 0.02%; Density-max. 2.3 lbs/cu ft.; ignition loss (1000°C. moisture-free basis) 2.5%; pH (4% aqueous dispersion) 3.5–4.2.), and 660 grams of glycerine. The mixture was worked in a three roll dispersing mill and then in a Wayne extruder having a screw 1 inch in diameter and 24 inches in length. The extruder was operated at 40 rpm, 1500 p.s.i.g. extrusion pressure and at a temperature of 140°F. The casing material was plasticized in the Wayne extruder and fed to a coextrusion die constructed substantially as shown in FIG. II. The die has a temperature of about 300°F. The gap between the mandrel and the body of the forward section was approximately 0.006 of an inch and the extruded film had a thickness of about 0.004 to 0.005 of an inch. During start-up, air at a pressure of about 2 to 4 p.s.i.g. was fed to the die 11 in order to prevent collapse of the extruded casing. A meat formulation of a type conventionally used for weiner emulsion and including ground pork, ground beef and spice was fed to the rear section of the die at a pressure of about 80–100 p.s.i.g. using a Zuber E-Z-PAC stuffer. As the meat began to extrude out of the forward end of the die, the pump 13 was reversed thereby placing the passageway 52 under a partial vacuum of about 3 millimeters of mercury. A satisfactory weiner product was then extruded.

The embodiments of the invention in which an exclusive property or privilege is claimed are defined as follows:

1. In apparatus for coextruding a heat sensitive material and a hot plastic mass for encasing said heat sensitive material, said apparatus including die means, means for supplying the heat sensitive material to said die means at extrusion pressures and means for supplying the hot plastic casing material to said die means at extrusion pressures, the improvement comprising a coextrusion die including:

means defining a central passageway through which the heat sensitive material may be extruded;

means defining a tubular passageway through which the casing material may be extruded, said tubular passageway co-axially surrounding said central passageway; and heat insulating means, said heat insulating means providing a heat barrier between the central passageway and the tubular passageway, the heat insulating means including a fluid carrying passageway and means for applying a vacuum to said fluid carrying passageway and wherein the fluid carrying passageway is under a partial vacuum and communicates with the interface between the hot casing material and the heat sensitive material at the point where said materials leave said die thereby removing any gaseous materials from between said casing material and said heat sensitive material.

2. In the apparatus of claim 1, the coextrusion die wherein heating means are provided for heating said tubular passageway and casing material.

3. Apparatus for coextruding meat and a protein material for encasing said meat, said apparatus comprising:

a coextrusion die including body means defining an extrusion passageway;

first tubular mandrel means disposed within said passageway in space relationship with said body means thereby defining a casing extrusion passageway between said body means and said first mandrel means;

second tubular mandrel means at least partially disposed within said first tubular mandrel means in space relationship with said first mandrel means thereby defining a gas passageway between said first mandrel means and said second mandrel means;

means for extruding meat material through said second tubular mandrel means;

means for extruding a hot plastic mass of casing material through said casing extrusion passageway thereby applying a thin film of said hot plastic mass around said extruding meat;

means for applying a partial vacuum to said gas passageway thereby removing gaseous products formed between the extruding meat and the extruding casing thereby providing close adherence between said meat and casing, said moving gaseous products providing a heat insulating barrier between said first mandrel means and said second mandrel means.

4. The apparatus of claim 3 wherein said body means further includes heating means for maintaining said protein material in a plastic condition during extrusion.

5. In apparatus for coextruding a heat sensitive material and a hot plastic mass for encasing said heat sensitive material, said apparatus including die means, means for supplying the heat sensitive material to said die means at extrusion pressures and means for supplying the hot plastic casing material to said die means at extrusion pressures, the improvement comprising a coextrusion die including:

means defining a central passageway through which the heat sensitive material may be extruded;

means defining a tubular passageway through which the casing material may be extruded, said tubular passageway co-axially surrounding said central passageway; and heat insulating means, said heat insulating means providing a heat barrier between the central passageway and the tubular passageway, said heat insulating means including fluid carrying passageway communicating with the interface between said heat sensitive material and said hot plastic mass, said heat insulating means including means for moving a gaseous fluid.

6. In apparatus for coextruding a heat sensitive material and a hot plastic mass for encasing said heat sensitive material, said apparatus including die means, means for supplying the heat sensitive material to said die means at extrusion pressures and means for supplying the hot plastic casing material to said die means at extrusion pressures, the improvement comprising a coextrusion die including:

means defining a central passageway through which the heat sensitive material may be extruded;

means defining a tubular passageway through which the casing material may be extruded, said tubular passageway co-axially surrounding said central passageway; and heat insulating means, said heat insulating means providing a heat barrier between the central passageway and the tubular passageway, said heat insulating means including fluid carrying passageway communicating with the interface between said heat sensitive material and said hot plastic mass, said heat insulating means including means for moving a fluid through said fluid carrying passageway.

7. In the apparatus of claim 6 wherein said fluid moving means comprise means for moving a fluid away from the interface between said heat sensitive material and said casing material.

8. In the apparatus of claim 7 wherein said fluid moving means comprise vacuum producing means.

9. Apparatus for coextruding a heat sensitive material and a hot plastic mass, said apparatus including die means, means for supplying the heat sensitive material to said die means at extrusion pressures and means for supplying the hot plastic mass to said die means at extrusion pressures, said die means including body means defining an elongated chamber, tubular mandrel means disposed within said chamber in spaced relationship with said body means thereby providing a first extrusion passageway therebetween for said hot plastic mass, tubular means at least partially disposed within said mandrel means in spaced relationship with said mandrel means thereby defining a heat insulating gas chamber therebetween, the interior of said tubular means providing a second extrusion passageway for said heat sensitive material, and means for placing said gas chamber under a partial vacuum.

* * * * *